Patented Sept. 5, 1944

2,357,409

UNITED STATES PATENT OFFICE 2,357,409

MANUFACTURE OF MOLDED COMPOSITIONS FOR BRAKE LININGS OR SIMILAR ARTICLES

Joseph N. Kuzmick, Clifton, N. J., assignor to Raybestos-Manhattan, Inc., Passaic, N. J., a corporation of New Jersey No Drawing. Application May 23, 1941, Serial No. 394,786

5 Claims. (Cl. 260—25)

This invention relates to the manufacture of molded composition brake linings and similar friction or tractive-surface bodies such as clutch facings, brake blocks and the like.

Brake linings and similar friction or tractive articles have been made by three general methods, namely, by (1) the impregnation of asbestos cloth or fabric with a suitable binder, (2) the felting together of asbestos fibres and impregnating the felted mass with the proper type of binder, and (3) the dry mixing of a binder with asbestos fibres, with or without fillers, and cold molding with subsequent baking or molding with heat and pressure to the desired shape. In all of these methods the binders used are of the type that react with heat to give the article a permanent shape or form and also contribute to the final serviceability of the product.

My present invention relates to the manufacture of brake linings and similar tractive-surface bodies according to the third type of method, and more particularly to such manufacture wherein potentially reactive synthetic resins are employed as the binder.

It has been the practice to modify such tractive-surface bodies as manufactured by this third type of method by combining various organic material with the particular type of resinous binder used. For example, if the brake lining had a tendency to score or abrade the contacting drum surface a percentage of vulcanized rubber crumb was used in the molded composition to alleviate the condition. If the coefficient of friction was too low, an addition of cashew nut shell liquid in the form of a resin thereof or in comminuted infusible form was used to assist in increasing the friction. The use of various oils, pitches, waxes, etc. has also been suggested.

These variously modified brake linings or blocks have, however, certain limitations, particularly for heavy duty service. If they are so formulated as to give a reasonable amount of service the lining or block hardens up, or more descriptively looses a greater part of its coefficient of friction, reflected in the very high pedal pressure required to actuate the mechanism or in the greatly reduced deceleration. If the lining is more loosely bonded so as to inhibit some of this hardening, the durability suffers to the extent that the service derived is inadequate. At best, the most judicious compounding provides or yields a lining which is only a compromise between these opposite limits.

After exhaustive investigation on the subject of such modifiers, the solution of the problem has been found to resolve itself into providing a binder having the following requirements or characteristics:

(1) Great and even exceptional adhesiveness or bond strength for bonding the asbestos fibres, (2) Elasticity very much greater than provided by the usual synthetic resinoid, (3) Elasticity which must persist at elevated temperatures induced by heavy duty decelerations, (4) A heat stability of the binder which is unaffected in the range of service temperatures during the life of the article.

The binders used in practice at present do not fulfill all these requirements. For example, synthetic resinoid binders are inelastic and harden up in use with a resulting loss in frictional qualities. Such binders modified with drying oils, such as tung oil, while more elastic to begin with, are not heat stable and become progressively harder during use with a resultant change in frictional qualities. Rubber bonds, whether straight or modified, while elastic and durable are very readily affected by the temperatures involved in service, so much so that the effectiveness of the friction element is seriously reduced.

I have discovered that under certain reaction or conversion conditions a binder composed of a synethetic resin and certain shellac reaction products provides a complex or dual bond which satisfies the four requirements enumerated above. Shellac, as is well known, is obtained from a resinous incrustation secreted by the insects, laccifer lacca Kerr. The resin is a solid solution of several closely related compounds and broadly can be characterized as a mixture of monobasic interester acids, interester lactone acids, and interester hydroxy acids, these interester acids apparently comprised of aleuritic, shellolic and kerrolic acids. For convenience, these acids will be hereinafter referred to as shellac acids.

These shellac acids react when heated with bases or metallic oxides, particularly the oxides of calcium, magnesium, zinc, barium and lead, to form the corresponding metallic salts of shellac acids. They also react in alkaline solution with the salts of these metals to form the corresponding metallic salts of shellac acids. These metallic salt reaction products provide resinous bodies which can no longer be considered as thermo-plastics since, on heating, they polymerize to infusibility with great rapidity. Furthermore, these reaction products retain the useful qualities of elasticity and unusual ability of wetting fillers and fibres possessed by natural shellac. It is these metallic salt reaction products of shellac acids which, when combined with a synthetic resinoid, I have found produce a bond which meets the four requirements above set forth. This dual bond possesses great wetting and adhesive ability and provides a bonding medium extremely durable and stable and having greatly increased elasticity which persists over the range of operating temperatures. The heat stability and elasticity of this bond insures unchanging performance during the life of the article.

I am aware that it has been proposed to use shellac in friction bodies. The suggested methods call for the addition of shellac or other natural resins to resins derived from the reaction of polybasic acids and polyhydric alcohols. This merely involves a simple solution of shellac in such a resin, or if an excess of alcohol is available, the possible formation of esters with the shellac acids. In any case, such products lack the heat stability and durability of the herein disclosed product. I have found that the use of shellac alone in the composition does not produce the results. The results are not produced for several reasons, among which are the thermoplastic nature of shellac and the fact that although shellac will become infusible to a minor degree (upon prolonged heating), the product is not heat stable to an extent suitable for bonding friction materials.

In the practice of my invention, I use a salt reaction product of shellac acids. Such a salt reaction product of shellac acids may be produced in the final molded friction product in a number of ways. According to one method, I produce the same in situ during the curing or indurating of the molded friction product. In this method, I use bases or metallic oxides, particularly an oxide of a metal such as calcium, magnesium, zinc, barium or lead, or mixtures thereof, and equivalents thereof, and introduce the same with the shellac into the mix to be molded. When this method is practiced, I may employ, for example, five to twenty-five per cent of the metallic oxide by weight of the shellac used.

According to another method, the salt reaction product of shellac acids is separately prepared prior to the incorporation thereof in the friction composition. In one way of carrying out the second method, I may directly use the salts of such metals as calcium, magnesium, zinc, barium or lead, or mixtures thereof, and as an example of said salts, I may employ the chlorides, sulphates, nitrates and acetates of these metals.

The First Method

Example 1

As a specific example of the practice of the invention in the making of a friction composition according to the first method, I take, all parts by weight, the following:

| | Parts |
|---|---|
| Pulverized heat hardenable synthetic resinoid such as a phenol-aldehyde resin | 20 |
| Pulverized shellac | 15 |
| Zinc oxide | 1½ |
| Calcium oxide | ¾ |
| Asbestos fibre | 65 |

These ingredients are mixed by means of a tumbling barrel or two-arm mixer to insure commingling of the various constituents. This provides a mix wherein the components are dispersed and suspended on the asbestos fibres. This is followed by spreading or leveling the mix, in a retaining form between sheet-metal plates, into a predetermined sheet, and then indurating or curing to resin infusibility by means of heat and pressure. Subsequently the sheet is cut into strips, formed and buffed to the required size.

In this example, the shellac reacts with the metallic oxide in situ during the cure to form the salt reaction product of shellac acids.

Example 2

In another preferred example following out this first method, I take, all parts by weight, the following:

| | Parts |
|---|---|
| Phenol | 1,000 |
| 40% aqueous formaldehyde | 800 |
| Concentrated sulphuric acid | 1¼ |

The above components are reacted in a suitable resin-making kettle provided with means for heating, stirring and refluxing for about three hours. The water layer is distilled off, and into the molten mass of resin is added and stirred 1000 parts of shellac in flake form and 200 parts of a metal oxide such as zinc oxide, followed by discharging into shallow pans and cooling. The cooled resin which is hard and friable, but still fusible, is ground or ball-milled with 6% of hexamethylenetetramine by weight of the resin used.

The ground resin mixture is used as in Example 1, except that components of the mix would read as follows:

| | Parts |
|---|---|
| Prepared phenol-aldehyde shellac resinoid | 38 |
| Asbestos fibres | 65 |

Here again, the shellac reacts with the metallic oxide in situ during the cure to form the salt reaction product of shellac acids.

The Second Method

Example 3

A convenient method for separately preparing these shellac reaction products, prior to incorporation in the friction composition, is by substitution or double decomposition. Natural shellac is dissolved in water made weakly alkaline with ammonia. Into this is slowly added a half normal solution of a metal salt such as calcium chloride, lead chloride, lead acetate, etc., until precipitation occurs. The precipitate is the corresponding metal salt of shellac acids. This is washed with water, filtered and dried in a warm current of air, and when free from moisture may be reduced to a fine, loose powder. This powder product is then blended in any desired proportion with the synthetic resinoid to provide the bond for the friction devices. This bond is then used as in Example 2 to make the molded composition. In this example, I may employ as the salts the chlorides, sulphates, nitrates and acetates of calcium, magnesium, zinc, barium or lead, or mixtures thereof.

Example 4

Another method of separately preparing these shellac reaction products prior to incorporating the same in the friction composition is by heating together shellac with a metallic oxide of the class already described, producing the metallic salt of the shellac acids. This is then ground and pulverized, and incorporated into the mix. In making this heat or fusion product, I may use from five to twenty-five per cent of the metal oxide on the weight of the shellac. This fusion or heat product is then blended in any desired proportion with the synthetic resinoid to provide the bond for the friction products. The bond is then used as in Examples 2 or 3 to make the molded composition.

While the proportions of shellac reaction products or salts to synthetic resinoid in any of the above examples can be varied, I find that optimum results appear to ensue from the use of about equal proportions by weight. However, I do not limit myself to these proportions, as the advantages described herein continue in evidence even though the proportions vary greatly in either direction from the optimum.

The synthetic resinoid employed is a synthetic resin of the phenol-aldehyde type, and by a synthetic resin of the phenol-aldehyde type, I specifically include those that result from the reaction products of phenol or its homologs, and formaldehyde, furfural or other methylene bodies such as hexamethylene-tetramine.

While the specific examples given describe a method of producing friction bodies wherein all the components are in the dry pulverized state and molded with heat and pressure, equal advantages flow from this invention when other methods are used, such as cold molding followed by oven curing to indurate the bond. To adjust the formulae given so as to provide a composition suitable for cold molding, it is only necessary to dissolve the synthetic resinoid in a suitable solvent, such as alcohol, to which is added the other ingredients as in Example 1 or 3, the mixer used being such as is commonly known as a change can mixer. After evaporation of the solvent, the material can be formed and pressed cold in a suitable mold, or can be extruded or otherwise formed, as for example, on the equipment well known in the art which is used to make the so-called wire backed lining.

The composition of the invention can also be considered different from the usual dry process composition, as it does not call for the inclusion of a plasticizer which is not only important but necessary in the products heretofore made. The bulky characteristics of asbestos fibre are such that in utilizing a dry pulverized resinoid binder, it is necessary to provide some additional fluxing means to wet such fibres. As in most cases, these plasticizers have no bond strength in themselves; they provide no additional merit to the utility of the finished product, and in most cases they are to be considered a necessary evil. This is so because of the fact that most plasticizers tend to bleed out at elevated temperatures and with a consequent loss of frictional coefficient. The use of the shellac reaction product completely avoids the necessity of using additional plasticizers. The flow and wetting characteristics of the dual bond of the invention are such that a most uniform and perfect wetting is accomplished.

The manufacture of molded compositions of friction material embodying the principles of my present invention and the many advantages thereof will in the main be fully apparent from the above detailed description thereof. Friction bodies are produced having exceptional heat stability and elasticity. The invention successfully meets the need of increasing demands now made upon friction materials due to greater car speeds and traffic conditions requiring fast decelerations. Durability of brake linings is increased thereby several fold (about 300%). At the same time, the braking characteristics have also been improved to a point where the product is capable of unlimited severe abuse. The braking characteristics of the product are also more uniform, that is, as the temperature increases, the bond becomes more limber and the resulting coefficient of friction likewise increases due to increasing yielding or elasticity of the bond.

I claim:

1. A molded composition of friction material comprising asbestos fibres bonded with a heat hardenable phenol-aldehyde synthetic resin and a reaction product of shellac acids and a compound of a metal in which the metal is taken from the class consisting of calcium, magnesium, zinc, barium and lead.

2. The molded composition of claim 1 in which the resin and the reaction product are in substantially equal proportions by weight and form a dual bond for the asbestos fibres.

3. A molded composition of friction material comprising asbestos fibres bonded with a heat hardenable phenol-aldehyde synthetic resin and a reaction product of shellac acids and a compound of a metal in which the metal is taken from the class consisting of calcium, magnesium, zinc, barium and lead, said molded composition being heat reacted to permanent shape.

4. A composition of friction material comprising the ingredients of asbestos fibres, a phenol-aldehyde potentially reactive synthetic resin, and the reaction product of shellac acids and a compound of a metal in which the metal is taken from the class consisting of calcium, magnesium, zinc, barium and lead, said ingredients being molded and heat reacted to permanent shape.

5. The composition of claim 4 in which the resin and the reaction product are of about equal proportions by weight and form a dual bond for the asbestos fibres.

JOSEPH N. KUZMICK.